(12) United States Patent
Sato et al.

(10) Patent No.: US 11,343,432 B2
(45) Date of Patent: May 24, 2022

(54) IMAGING APPARATUS

(71) Applicant: CANON KABUSHIKI KAISHA, Tokyo (JP)

(72) Inventors: Natsuko Sato, Yokohama (JP); Shunsuke Chino, Wako (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/666,460

(22) Filed: Oct. 29, 2019

(65) Prior Publication Data

US 2020/0137313 A1     Apr. 30, 2020

(30) Foreign Application Priority Data

Oct. 30, 2018  (JP) .............................. JP2018-203640
Sep. 24, 2019  (JP) .............................. JP2019-173150

(51) Int. Cl.
*H04N 5/232* (2006.01)
*H04N 5/225* (2006.01)

(52) U.S. Cl.
CPC ....... *H04N 5/23299* (2018.08); *H04N 5/2259* (2013.01); *H04N 5/232123* (2018.08); *H04N 5/232127* (2018.08)

(58) Field of Classification Search
CPC ....... H04N 5/232123; H04N 5/232127; H04N 5/2259; H04N 5/23299
See application file for complete search history.

(56) References Cited

U.S. PATENT DOCUMENTS 5,432,331 A * 7/1995 Wertheimer ............. G02B 7/28
                                                     250/201.7
5,453,784 A * 9/1995 Krishnan ........... H04N 5/23212
                                                     348/348

(Continued)

FOREIGN PATENT DOCUMENTS

CN      103246131 A      8/2013
CN      104718494 A      6/2015

(Continued)

OTHER PUBLICATIONS

Extended European Search Report issued by the European Patent Office dated Mar. 30, 2020 in corresponding European Patent Application No. 19205835.2.

(Continued)

*Primary Examiner* — John Villecco
(74) *Attorney, Agent, or Firm* — Carter, DeLuca & Farrell LLP

(57) ABSTRACT

An imaging apparatus includes a controller configured to change a tilt angle between an image sensor and a plane orthogonal to an optical axis of an optical system by adjusting a tilt of the image sensor or the optical system, an evaluation value acquirer configured to acquire contrast evaluation values of a plurality of areas in an image by changing the tilt angle through the controller, and a determiner configured to determine the tilt angle for each of the plurality of areas based on the contrast evaluation values of the plurality of areas acquired by the evaluation value acquirer, and to determine the tilt angle based on the tilt angle of each determined area. The controller adjusts the tilt of the image sensor or the optical system based on the tilt angle determined by the determiner.

14 Claims, 10 Drawing Sheets

(56) References Cited

U.S. PATENT DOCUMENTS

| | | | |
|---|---|---|---|
| 6,023,056 A * | 2/2000 | Fiete | G02B 7/36 250/201.7 |
| 6,072,529 A * | 6/2000 | Mutze | H04N 5/232 348/351 |
| 6,359,650 B1 | 3/2002 | Murakami | |
| 6,567,126 B1 * | 5/2003 | Slatter | G02B 7/28 348/345 |
| 7,183,530 B2 * | 2/2007 | Abe | G02B 27/64 250/201.2 |
| 7,605,860 B2 * | 10/2009 | Saitoh | G03B 5/06 348/345 |
| 7,634,184 B2 * | 12/2009 | Woehler | G03B 5/08 348/294 |
| 7,817,205 B2 * | 10/2010 | Schulte | G03B 5/06 348/360 |
| 7,880,797 B2 * | 2/2011 | Nanjo | G03B 5/06 348/335 |
| 8,698,945 B2 * | 4/2014 | Foote | H04N 5/232123 348/351 |
| 9,366,839 B2 * | 6/2016 | Shigemitsu | G03B 43/00 |
| 9,781,334 B2 * | 10/2017 | Chen | H04N 5/2259 |
| 10,345,615 B2 * | 7/2019 | Okuda | H04N 5/23258 |
| 2006/0082657 A1 * | 4/2006 | Meier | H04N 5/2259 348/208.7 |
| 2006/0082841 A1 * | 4/2006 | Shiratani | H04N 5/2259 358/474 |
| 2011/0176035 A1 | 7/2011 | Poulsen | |
| 2017/0272658 A1 * | 9/2017 | Ito | G02B 7/38 |
| 2019/0199912 A1 * | 6/2019 | Nagano | H04N 5/23293 |
| 2020/0099851 A1 * | 3/2020 | Chino | H04N 5/23212 |
| 2020/0128162 A1 * | 4/2020 | Takami | H04N 5/2259 |
| 2020/0137293 A1 * | 4/2020 | Numata | H04N 5/232123 |
| 2020/0137313 A1 * | 4/2020 | Sato | H04N 5/232127 |
| 2020/0177817 A1 * | 6/2020 | Osawa | H04N 5/2259 |
| 2020/0177820 A1 * | 6/2020 | Kobayashi | G08B 13/19686 |
| 2020/0186690 A1 * | 6/2020 | Kodama | H04N 5/2259 |
| 2020/0191563 A1 * | 6/2020 | Sato | H04N 5/23299 |
| 2020/0213523 A1 * | 7/2020 | Niga | H04N 5/232933 |
| 2020/0236290 A1 * | 7/2020 | Kawasaki | G03B 3/10 |
| 2020/0275032 A1 * | 8/2020 | Kimura | H04N 5/2353 |
| 2020/0296296 A1 * | 9/2020 | Chino | G03B 5/08 |
| 2020/0304721 A1 * | 9/2020 | Sugaya | H04N 5/23299 |
| 2021/0067702 A1 * | 3/2021 | Sato | H04N 5/2253 |
| 2021/0067704 A1 * | 3/2021 | Chino | H04N 5/232122 |

FOREIGN PATENT DOCUMENTS

| | | | |
|---|---|---|---|
| CN | 104853105 A | | 8/2015 |
| JP | 11190864 A | * | 7/1999 |
| JP | 11242152 A | * | 9/1999 |
| JP | H11242152 A | | 9/1999 |
| JP | 2002325199 A | * | 11/2002 |
| JP | 2012128021 A | * | 7/2012 |
| JP | 2016080738 A | | 5/2016 |
| JP | 2017173802 A | | 9/2017 |
| JP | 2017220864 A | * | 12/2017 |

OTHER PUBLICATIONS

Notification of the First Office Action dated May 7, 2021 by the China National Intellectual Property Administration in corresponding CN Patent Application No. 201911043678.7, with English translation.

Notification of Decision to Grant Patent Right issued by the China National Intellectual Property Administration dated Nov. 15, 2021 in corresponding CN Patent Application No. 201911043678.7, with English translation.

* cited by examiner

| CONTROL METHOD | SUITABLE USE CASE |
|---|---|
| CONTROL TO SET THE HIGHEST OPTIMAL TILT ANGLE AMONG PLURALITY OF OPTIMAL TILT ANGLES | DEEPER DEPTH PRIORITY CASE |
| CONTROL TO SET THE LOWEST OPTIMAL TILT ANGLE AMONG PLURALITY OF OPTIMAL TILT ANGLES | VERTICAL BLUR PREVENTION PRIORITY CASE FOR TILT FOCUS PLANE |
| CONTROL TO SET AVERAGE VALUE OF PLURALITY OF OPTIMAL TILT ANGLE | WIDER IN-FOCUS RANGE PRIORITY CASE |
| CONTROL TO SET OPTIMAL TILT ANGLE FOR AREA SELECTED BY USER | NOTICEABLE AREA DETERMINED CASE |

FIG. 12

IMAGING APPARATUS

BACKGROUND OF THE INVENTION

Field of the Invention

The present invention relates to an imaging apparatus configured to provide a tilt control.

Description of the Related Art

One conventional surveillance camera is installed at a high location, such as a ceiling, while its optical axis is directed obliquely downwardly to monitor a person passing on a road or to capture a car or its license plate (number plate). Since the optical axis of the camera is obliquely downwardly directed and a focal plane that is focused in imaging is orthogonal to the optical axis, the focal plane does not coincide with an imaging plane of an object to be actually captured. Hence, an in-focus area becomes part of the image, and the other area is out of focus. One solution for this problem is a generally known technique called the Scheimpflug principle that expands the depth of field by tilting the optical system or the image sensor (referred to as a tilt control hereinafter).

In controlling the tilt of the image sensor using the contrast of the captured image as an evaluation value, a position of an evaluation frame used to acquire the evaluation value in the captured image becomes important. The evaluation frame should be provided in an in-focus area in the tilt control, but the area suitable to obtain the evaluation value differs depending on the imaging scene. Hence, it is necessary for an automatic tilt control to detect the in-focus area in the tilt control and to determine the tilt angle based on the evaluation value acquired in the in-focus area.

Japanese Patent Laid-Open No. ("JP") 11-242152 discloses an imaging apparatus that provides a tilt control using a tilt angle calculated based on focus information obtained in a plurality of predetermined areas in an imaging area. JP 2017-173802 discloses an imaging apparatus that provides a tilt control using a tilt angle calculated based on a focus shift amount of each of a plurality of focus detection areas.

The imaging apparatus disclosed in JP 11-242152 prohibits the tilt control, if the mutual coincidence of the plurality of obtained tilt angles is lower than a predetermined value. Thus, even in an imaging scene in which a depth of an object becomes deeper due to the tilt imaging, the control may be prohibited depending on the area for acquiring the focus information. In the imaging apparatus disclosed in JP 2017-173802, the user can individually specify a target to be focused among the plurality of focus detection areas, or the area is determined based on a mode selection for each preset group in a horizontal direction, a vertical direction, or a diagonal direction. Thus, the in-focus area cannot be specified without the user designation or the mode selection.

SUMMARY OF THE INVENTION

The present invention provides an imaging apparatus configured to provide a tilt control with a tilt angle suitable for an imaging scene.

An imaging apparatus according to one aspect of the present invention includes a controller configured to change a tilt angle between an image sensor and a plane orthogonal to an optical axis of an optical system by adjusting a tilt of the image sensor or the optical system, an evaluation value acquirer configured to acquire contrast evaluation values of a plurality of areas in an image by changing the tilt angle through the controller, and a determiner configured to determine the tilt angle for each of the plurality of areas based on the contrast evaluation values of the plurality of areas acquired by the evaluation value acquirer, and to determine the tilt angle based on the tilt angle of each determined area. The controller adjusts the tilt of the image sensor or the optical system based on the tilt angle determined by the determiner.

Further features of the present invention will become apparent from the following description of exemplary embodiments with reference to the attached drawings.

BRIEF DESCRIPTION OF THE DRAWINGS

FIG. 12 illustrates a correspondence between four control methods and use cases suitable for the control methods when there are a plurality of areas to be detected as the tilt focus plane.

DESCRIPTION OF THE EMBODIMENTS

Figure 1:
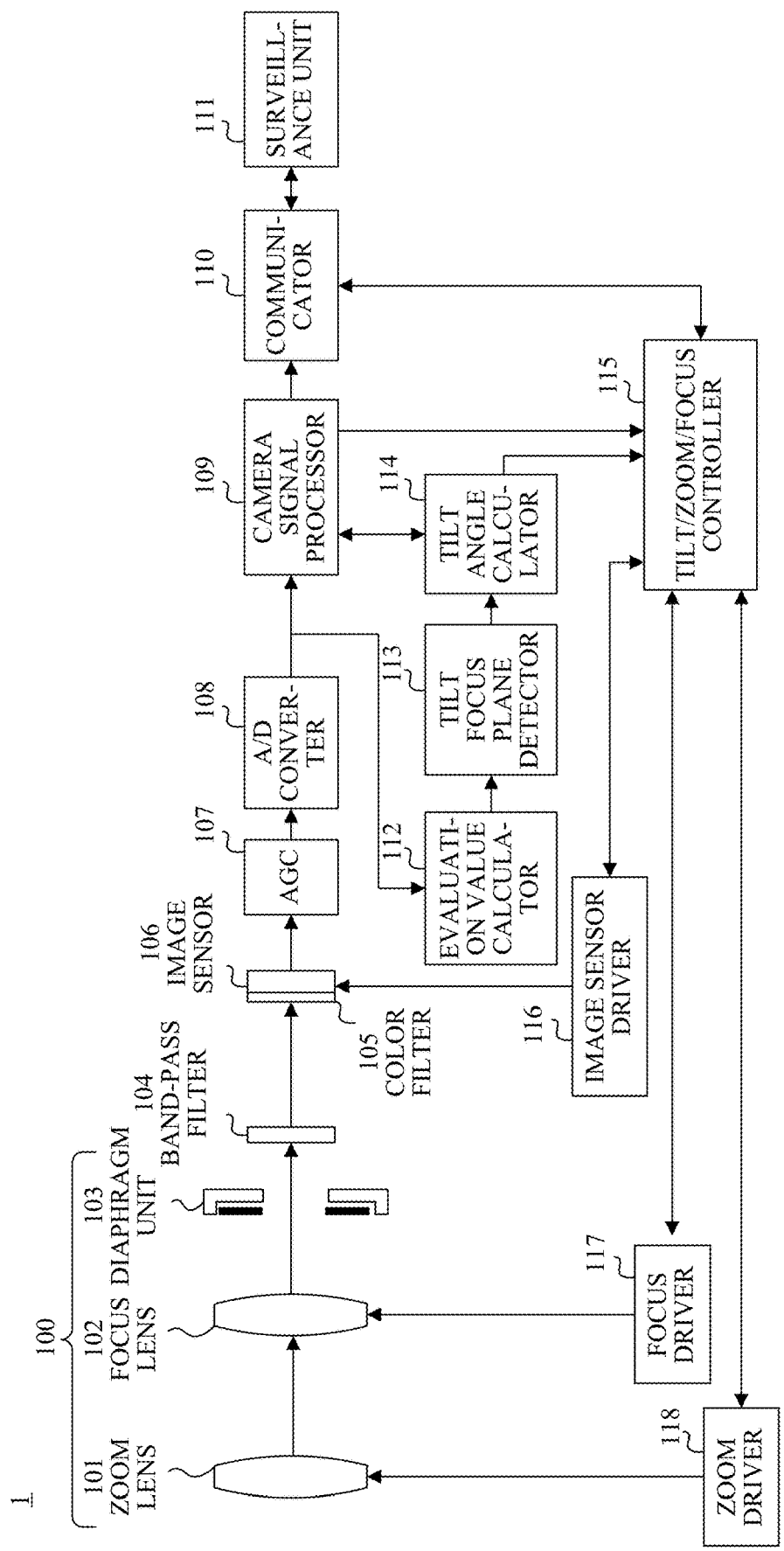
FIG. 1 is a block diagram of an imaging apparatus according to one embodiment of the present invention.

Referring now to the accompanying drawings, a description will be given of embodiments according to the present invention. Corresponding elements in respective figures will be designated by the same reference numerals, and a duplicate description thereof will be omitted.

Overall Structure

FIG. 1 is a block diagram of an imaging apparatus 1 according to one embodiment of the present invention. An optical system 100 includes a zoom lens 101 that moves in an optical axis direction to change a focal length, a focus lens 102 that moves in the optical axis direction for focusing, and a diaphragm unit 103 that adjusts a light amount. The optical system 100 does not necessarily include the zoom lens 101, the focus lens 102, or the aperture unit 103, and may include another optical element.

The light that has passed through the optical system 100 forms an object image as an optical image on an image sensor 106 via a band-pass filter (BPF hereinafter) 104 and a color filter 105. The BPF 104 may be inserted into and ejected from the optical path of the optical system 100. The object image is photoelectrically converted by the image sensor 106.

An analog electric signal (imaging signal) output from the image sensor 106 is gain-controlled by an AGC 107, converted into a digital signal by an A/D converter 108, and then input into a camera signal processor 109. The camera signal processor 109 performs various types of image processing for the digital imaging signal to generate an image signal. The image signal is output to a surveillance unit 111 connected to the imaging apparatus 1 via a communicator 110 by a wired or wireless communication.

An evaluation value calculator 112 receives RGB pixel values or luminance values from the A/D converter 108 or the camera signal processor 109 for each evaluation frame set in the image, and calculates an evaluation value relating to a contrast at a specific frequency used for the tilt control and AF control.

A tilt focal plane detector 113 detects an in-focus area (tilt focal plane hereinafter) in the tilt control based on the evaluation value of each evaluation frame calculated by the evaluation value calculator 112.

A tilt angle calculator 114 calculates the tilt angle based on the evaluation value of the evaluation frame existing on the tilt focal plane detected by the tilt focal plane detector 113.

A tilt/zoom/focus controller 115 controls an image sensor driver 116, a focus driver 117, and a zoom driver 118 based on an instruction from a communicator 110 corresponding to an external command and the tilt angle calculated by the tilt angle calculator 114. More specifically, a tilt angle set position, a focus set position, and a zoom set position are instructed to each of the image sensor driver 116, the focus driver 117, and the zoom driver 118.

Figure 9:
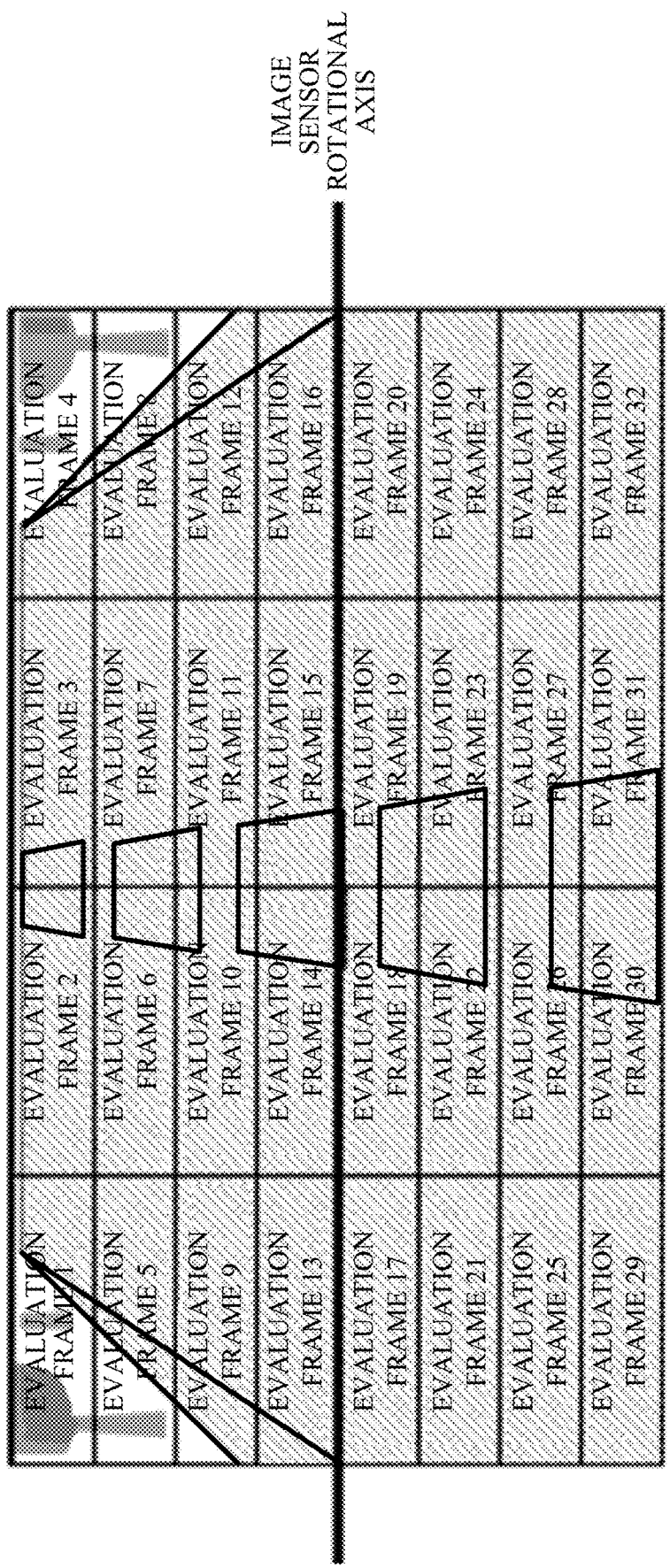
FIG. 9 illustrates an image sensor rotational axis and an evaluation frame of the image sensor.

The image sensor driver 116 tilts the image sensor 106 around an image sensor rotational axis based on the tilt angle set position instructed from the tilt/zoom/focus controller 115. This embodiment provides the image sensor rotational axis for tilting the image sensor 106 at the center of the image as illustrated in FIG. 9.

The focus driver 117 controls the position of the focus lens 102 based on the focus set position instructed from the tilt/zoom/focus controller 115.

The zoom drive unit 118 controls the position of the zoom lens 101 based on the zoom set position instructed from the tilt/zoom/focus controller 115.

Figure 2:
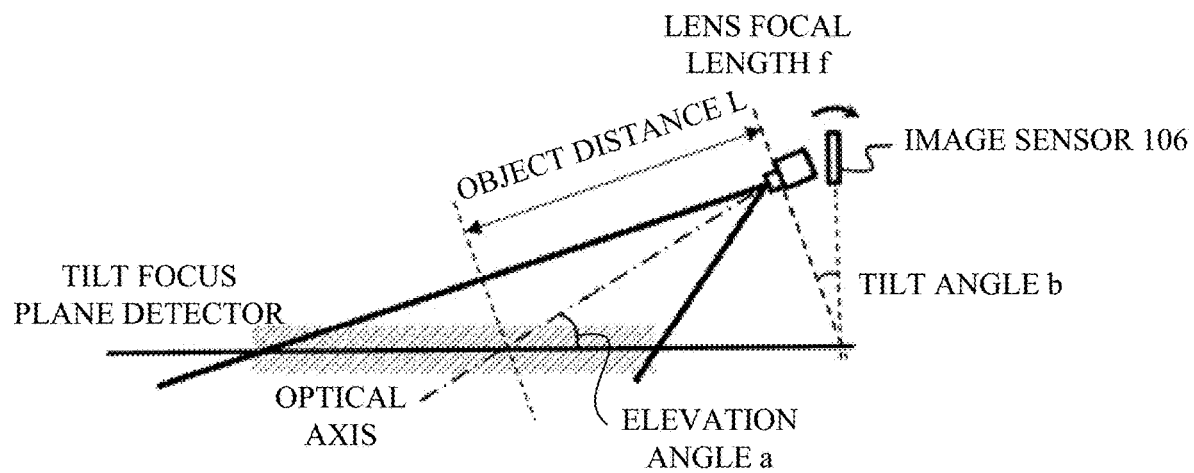
FIG. 2 explains a tilt control.

Herein, the tilt control is a control that tilts the optical system 100 or the image sensor 106 and adjusts the tilt focal plane to a plane such as the ground. FIG. 2 explains the tilt control, and illustrates the tilted image sensor 106. The tilt control enables a short-distance object to a long-distance object to be located in a depth of field for a predetermined plane and maintains an in-focus state.

Where f is a focal length of the lens, L is an object distance, and α is an angle between the optical axis and the focal plane (elevation angle), a tilt angle b is calculated by the following expression (1) based on the Scheimpflug principle.

$$b = \tan^{-1}(f/(L \tan \alpha)) \quad (1)$$

According to the Scheimpflug principle, when the principal surface of the optical system and the imaging plane of the image sensor intersect with a single straight line, the focal plane also intersects on the same straight line. Thus, if only part of the image is focused when the optical system and the image sensor are parallel to each other, a wider area on the image is focused by tilting the optical system or the image sensor. As illustrated in FIG. 2, when the image sensor is tilted by the tilt angle b, the tilt focal plane becomes a single plane. Hence, the evaluation frame for the tilt control may be set within a single plane area that is the tilt focus plane.

Figure 3A:
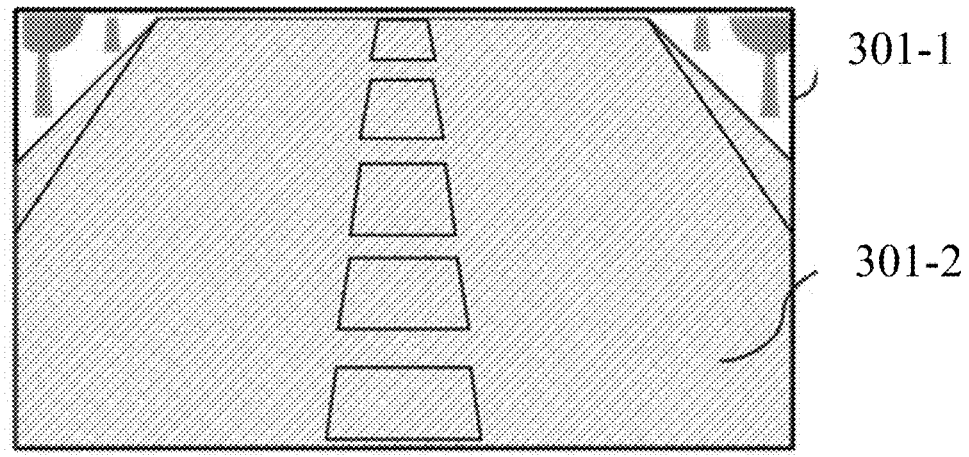
FIGS. 3A and 3B illustrate two imaging scenes having different angles of view.
Figure 3B:
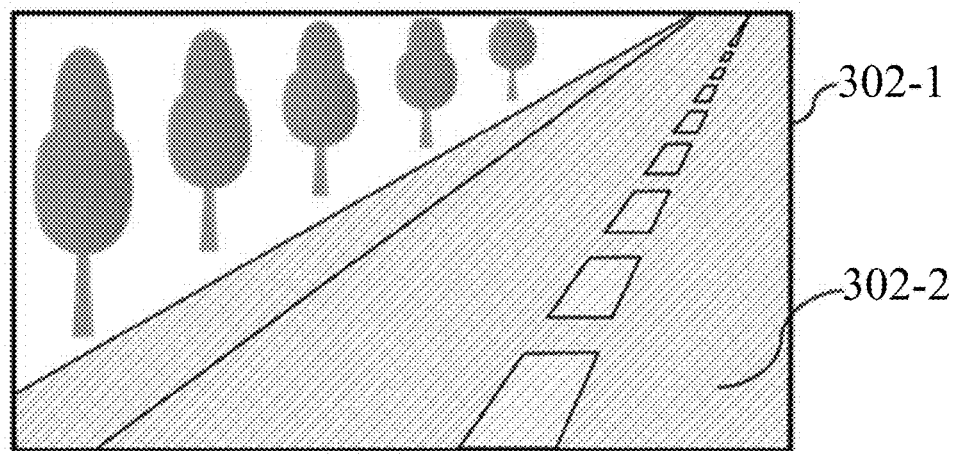

However, the tilt focus plane is different depending on the imaging scene. FIGS. 3A and 3B illustrate two imaging scenes having different angles of view. In an image 301-1 in FIG. 3A, a tilt focus plane 301-2 occupies a wide area, and an area excluding the left and right upper corners is suitable to obtain the evaluation value. On the other hand, in an image 302-1 in FIG. 3B, a tilt focal plane 302-2 is about half of the focal plane 301-2, and if the evaluation value is acquired at the upper left portion, the tilt control cannot be performed well. The tilt focus plane thus differs depending on each imaging scene. In order to perform a tilt control according to the imaging scene, it is necessary to detect the tilt focus plane for each imaging scene, and to determine the tilt angle based on the evaluation value acquired on the detected tilt focus plane.

First Embodiment

There are multiple methods for detecting a tilt focal plane for each imaging scene. For example, one of them is to detect the tilt focal plane based on the evaluation value acquired for each of a plurality of areas on an image. This embodiment acquires the contrast as an evaluation value, and detects the tilt focal plane based on the acquired evaluation value. Then, a tilt angle suitable for the detected tilt focal plane is determined.

Figure 4:
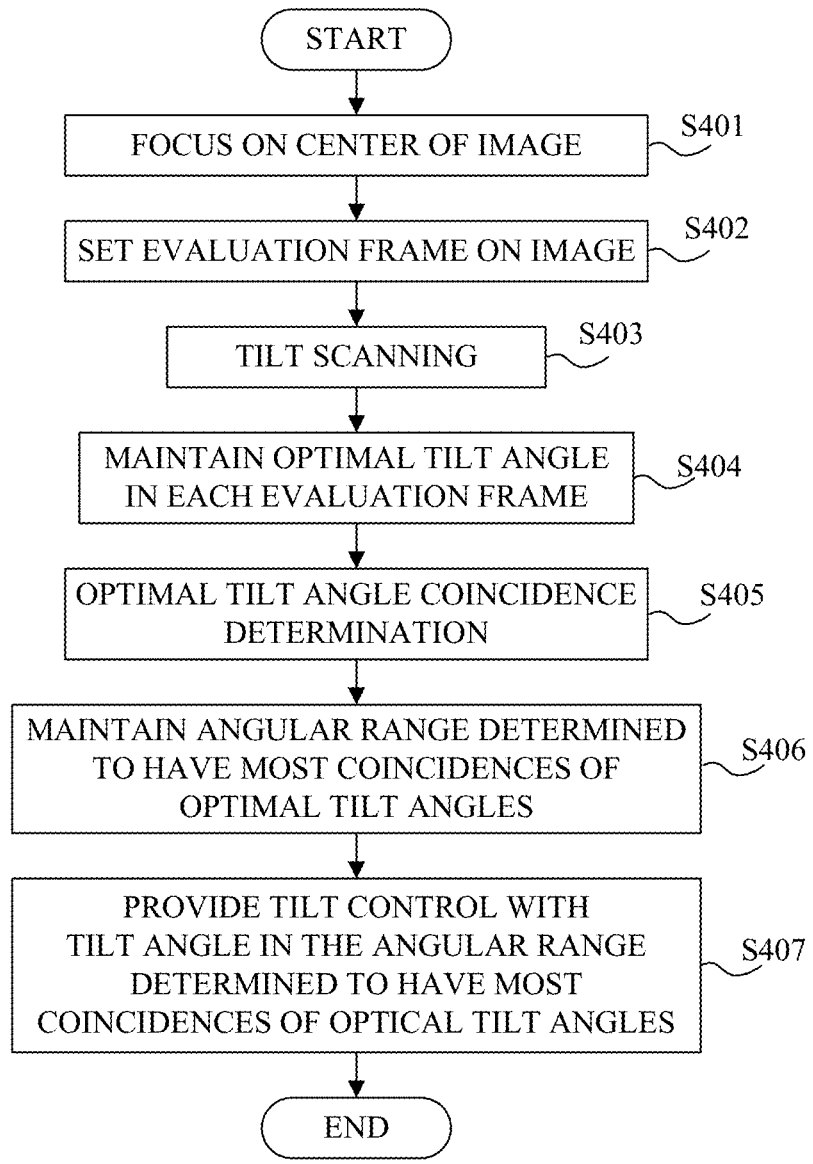
FIG. 4 is a flowchart illustrating processing executed by an imaging apparatus according to a first embodiment.

Referring now to FIG. 4, a description will be given of processing executed by the imaging apparatus 1 according to this embodiment. FIG. 4 is a flowchart illustrating processing executed by the imaging apparatus 1.

In the step S401, the tilt/zoom/focus controller 115 drives the focus lens 102 via the focus drive unit 117 to focus on the center of the image. Focusing may be performed by autofocusing (AF hereinafter) or manual focusing (MF hereinafter).

Figure 5A:
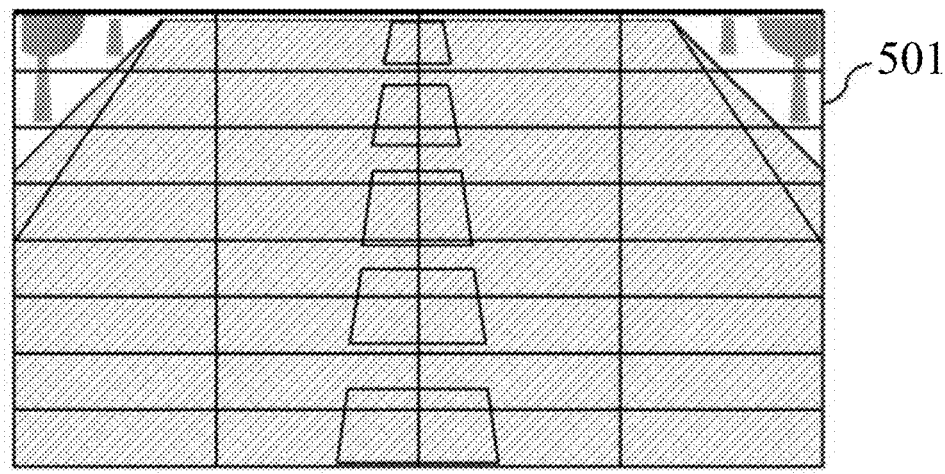
FIGS. 5A and 5B illustrate evaluation frames set in an image.
Figure 5B:
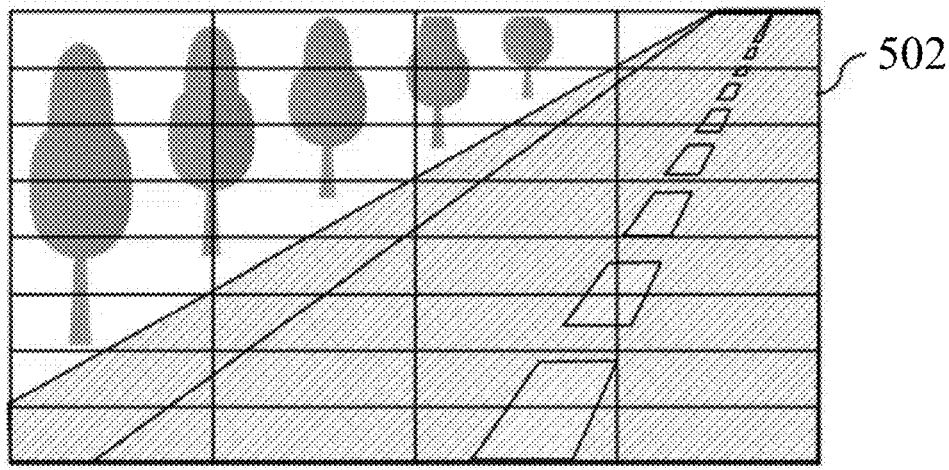

In the step S402, the tilt/zoom/focus controller 115 sets a plurality of evaluation frames on the image. FIGS. 5A and 5B illustrate the evaluation frames set in the image. FIG. 5A illustrates an evaluation frame 501 set in the image 301-1 in FIG. 3A. FIG. 5B illustrates an evaluation frame 502 set in the image 302-1 in FIG. 3B. In FIGS. 5A and 5B, each captured image is divided into four rows and eight columns, but the division method is not limited to this example. The evaluation frame may be divided down to the pixel unit. In other words, each evaluation frame may include one or more pixels.

Figure 6:
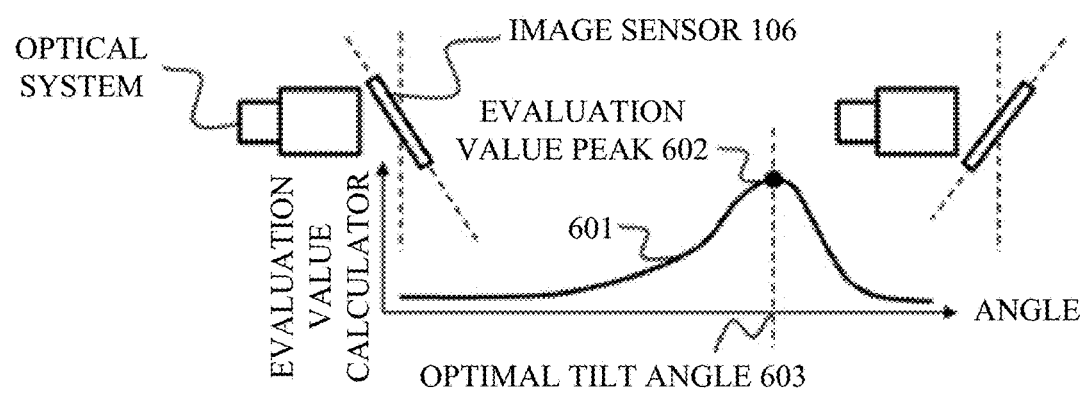
FIG. 6 is a schematic diagram of tilt scanning.

In the step S403, the evaluation value calculator 112 performs tilt scanning. FIG. 6 is a schematic diagram of the tilt scanning. The tilt scanning is a control for obtaining an evaluation value relating to the contrast for each evaluation frame set in the step S402 while changing the tilt angle of the image sensor 106. The evaluation value 601 is an evaluation value relating to the contrast obtained in a predetermined evaluation frame in a predetermined imaging scene. An evaluation value peak 602 is the maximum (or highest) value among the evaluation values 601. In the evaluation frame in which the evaluation value 601 is obtained, the tilt angle that provides the evaluation value peak 602 is an in-focus tilt angle (optimal tilt angle hereinafter) 603.

Figure 7B:
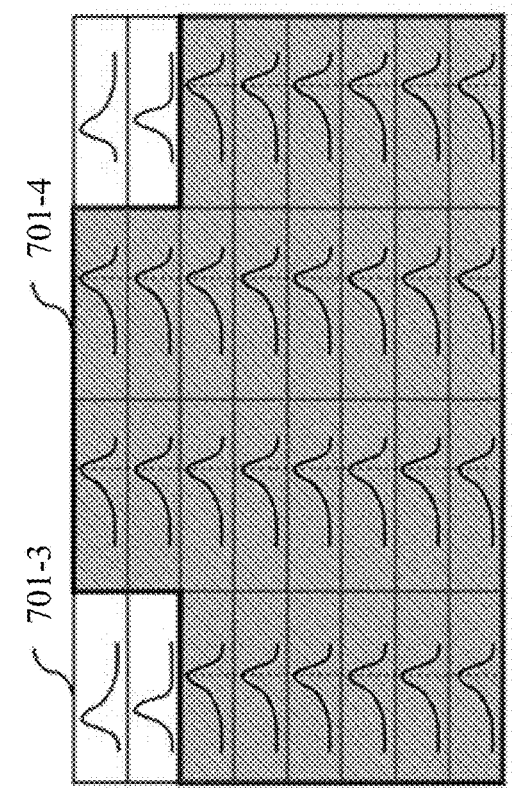
FIGS. 7A to 7D illustrate a tilt focal plane detection result and a tilt scanning result in each evaluation frame.

FIGS. 7A to 7D illustrate the tilt focal plane detection result and the tilt scanning result for each evaluation frame. A tilt scanning result 701-3 in FIG. 7B is obtained when the tilt scanning is performed for an image 701-1 in FIG. 7A in each evaluation frame. A tilt scanning result 702-3 in FIG.

Figure 7D:
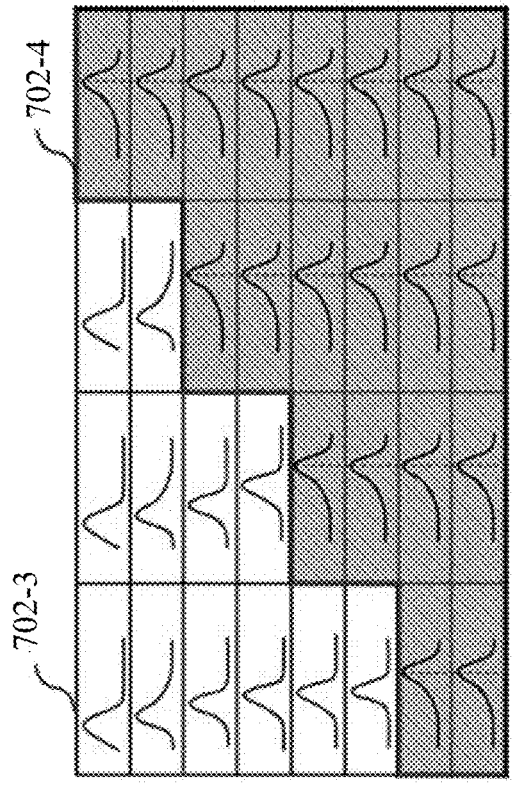
Figure 7A:
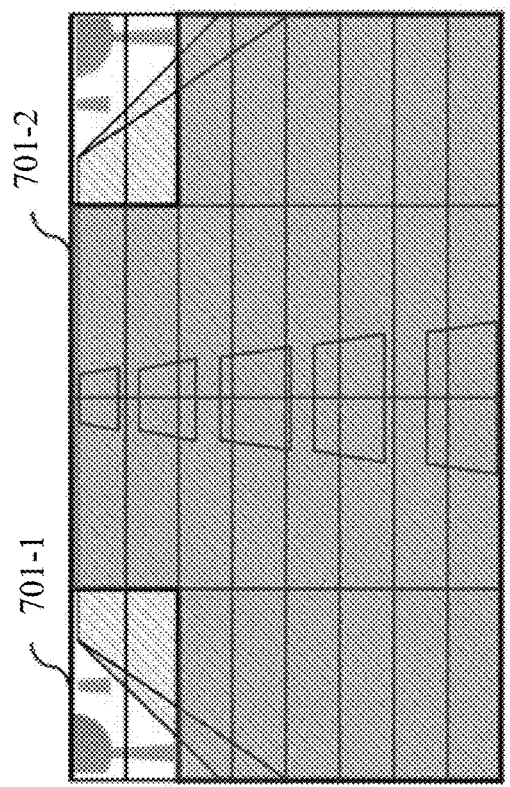
Figure 7C:
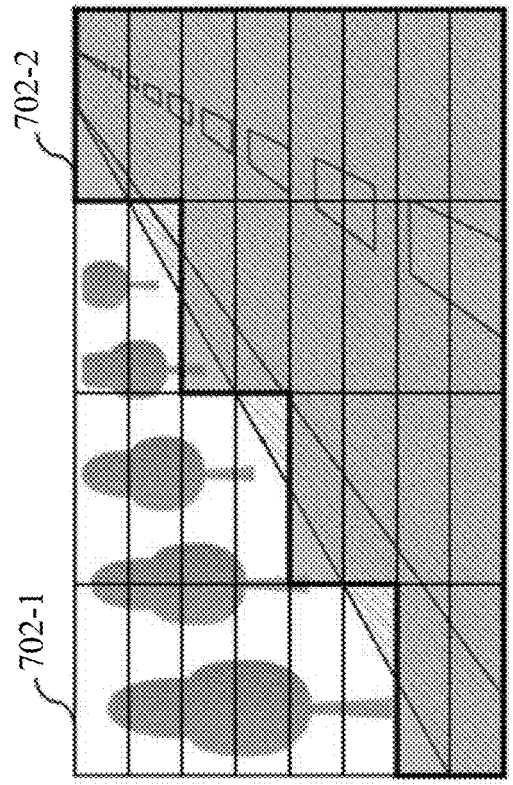

7D is obtained when the tilt scanning is performed for an image 702-1 in FIG. 7C in each evaluation frame. For both images, the same optimal tilt angle 603 is acquired in the evaluation frames on the tilt focus plane. On the other hand, the optimal tilt angle 603 different from that for the tilt focal plane area is acquired in an evaluation frame having a tall object.

In the step S404, the tilt focal plane detector 113 maintains the optimal tilt angle 603 in each evaluation frame obtained in the step S403.

In the step S405, the tilt focal plane detector 113 detects the tilt focal plane based on the optimal tilt angle 603 in each evaluation frame maintained in the step S404. The tilt focal plane detector 113 uses the fact that the optimal tilt angles coincide with each other on the same plane, and determines whether or not the optimal tilt angles in the respective evaluation frames coincide with each other (optimal tilt angle coincidence determination hereinafter). The area having the most coincidences of the optimal tilt angles is detected as the tilt focus plane. The result of performing the optimal tilt angle coincidence determination based on the tilt scanning result 701-3 in FIG. 7B is an evaluation frame 701-4 having the most coincidences of the optimal tilt angles. The result of performing the optimal tilt angle coincidence determination based on the tilt scanning result 702-3 in FIG. 7D is an evaluation frame 702-4 having the most coincidences of the optimal tilt angles. The areas where the evaluation frames 701-4 and 702-4 having the most coincidences of the optimal tilt angles are superimposed on the images 701-1 and 701-2 are the tilt focal planes 701-2 and 702-2. Thus, the optimal tilt angle coincidence determination enables only the evaluation frame that has the tilt focus plane to be detected. It is possible to remove an evaluation frame area having a tall object and thus an evaluation value unsuitable for the tilt angle calculation.

In this embodiment, the optimal tilt angle coincidence determination covers the perfect coincidence of the optimal tilt angle, but also the substantial coincidence in which the optimal tilt angle exists within a predetermined angular range. Thus, an angular range containing the most optimal tilt angles of the same type (angular range having the most coincidences hereinafter) is obtained by the optimal tilt angle coincidence determination. The angular range may be determined based on the depth of focus calculated using at least one of the focal length, the object distance, the sensor size, the temperature, the humidity, and the light source.

In the step S406, the tilt angle calculator 114 maintains the angular range having the most coincidences obtained in the step S405.

In the step S407, the tilt/zoom/focus controller 115 performs the tilt control for driving the image sensor 106 so that the tilt angle is located within the angular range having the most coincidences maintained in the step S406. In this embodiment, the tilt/zoom/focus controller 115 determines the tilt angle for the tilt control based on at least one of the minimum value, the maximum value, the average value of the optimal tilt angle included in the angular range having the most coincidences, and the optimal tilt angle having a large absolute value of the evaluation value peak. The value is determined based on at least one of the optimal tilt angles having a large value. The average value may be calculated based on the maximum value and the minimum value of the evaluation values obtained in each evaluation frame, and a weighted value such that an optima tilt angle of an evaluation frame with a larger difference can be more advantageous. In addition, the average value may be calculated by a weighted value based on the peak shape of the evaluation value acquired in each evaluation frame such that an optimal tilt angle of an evaluation frame having a steeper peak can be more advantageous.

As described above, this embodiment acquires the tilt angle suitable for the tilt focal plane even in an imaging scene with a different composition by detecting the tilt focal plane and by determining the tilt angle used for tilt control. Therefore, the automatic tilt control suitable for the focal plane can be performed.

While this embodiment tilts the image sensor 106, but the present invention is not limited to this embodiment. The effect of the present invention can also be obtained by tilting the optical system through a controller (not shown) configured to control the tilt of the optical system 100 or by tilting both the image sensor 106 and the optical system 100.

Second Embodiment

This embodiment performs a tilt control while excluding an evaluation frame which has a difficulty in obtaining an accurate optimal tilt angle (or which yields an optimal tilt angle with a low reliability) and causes a noise in the optimal tilt angle coincidence determination.

Figure 8A:
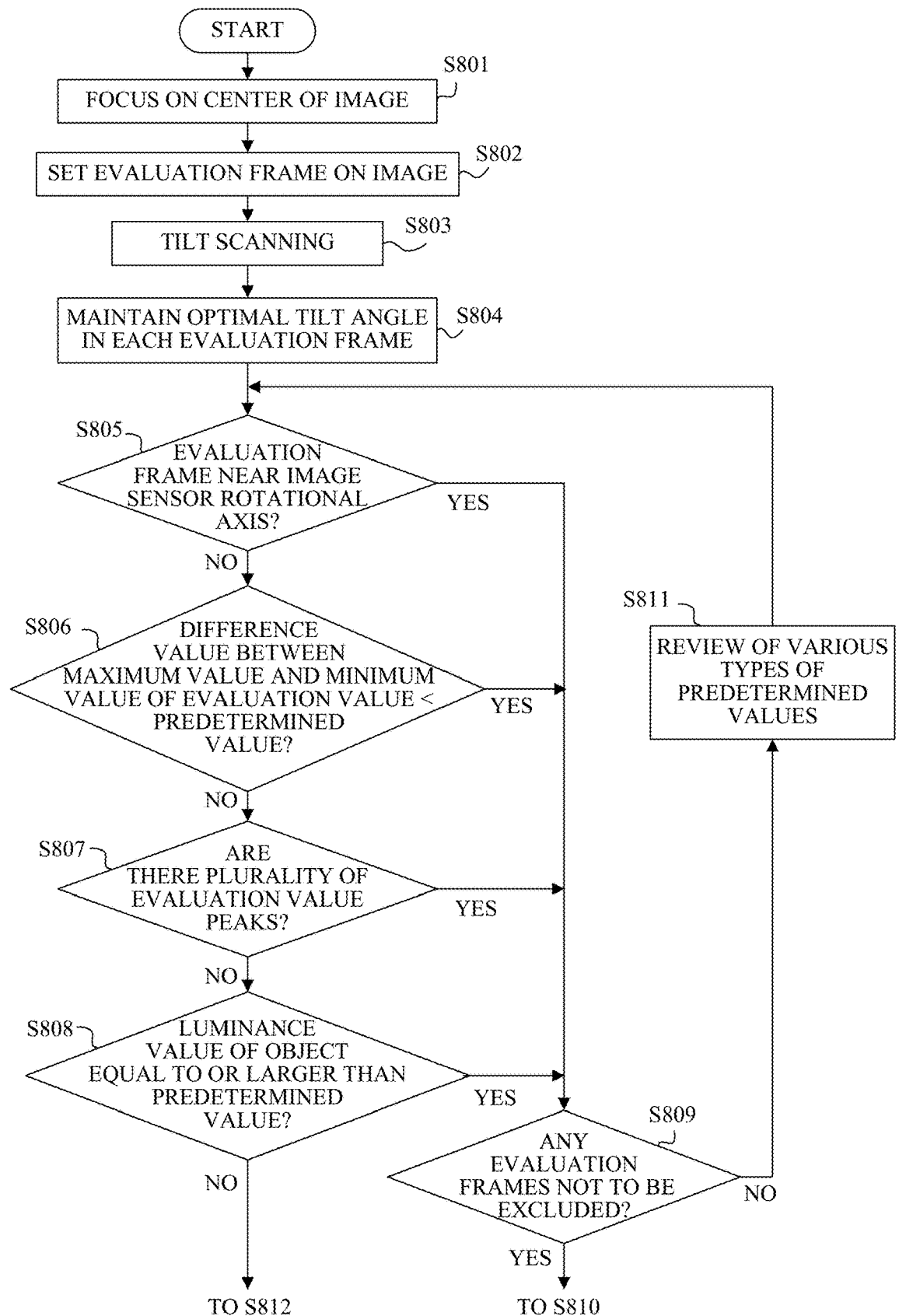
FIGS. 8A and 8B illustrate a flowchart illustrating processing executed by an imaging apparatus according to a second embodiment.
Figure 8B:
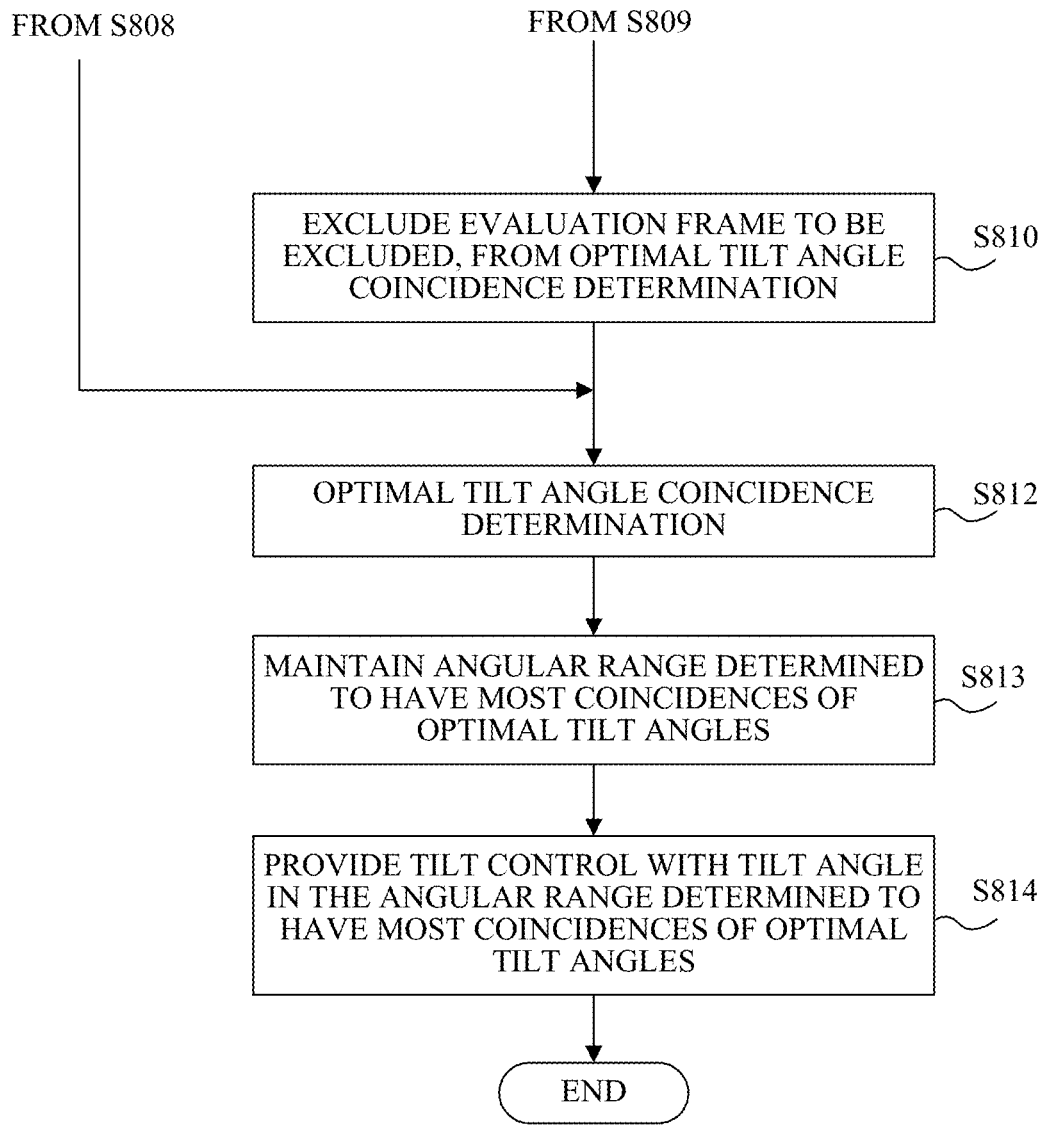

Referring now to FIGS. 8A and 8B, a description will be given of processing executed by the imaging apparatus 1 according to this embodiment. FIGS. 8A and 8B illustrate a flowchart illustrating processing executed by the imaging apparatus 1. A detailed description of the processing common to the flowchart in FIG. 4 in the first embodiment will be omitted.

In the step S801, the tilt/zoom/focus controller 115 drives the focus lens 102 via the focus drive unit 117 to focus on the center of the image.

In the step S802, the tilt/zoom/focus controller 115 sets a plurality of evaluation frames on the image.

In the step S803, the evaluation value calculator 112 performs tilt scanning.

In the step S804, the tilt focal plane detector 113 maintains the optimal tilt angle 603 in each evaluation frame obtained in the step S803.

In the step S805, the tilt/zoom/focus controller 115 determines whether or not the evaluation frame set in the step S802 is an evaluation frame near the image sensor rotational axis. If the evaluation frame set in the step S802 is the evaluation frame near the image sensor rotational axis, the flow proceeds to the step S809. If the evaluation frame is not near the image sensor rotational axis, the flow proceeds to the step S806.

FIG. 9 illustrates the image sensor rotational axis and evaluation frames on the image sensor 106. When the image sensor 106 is tilted around the image sensor rotational axis illustrated in FIG. 9, a change in the evaluation value is more significant by tilting the image sensor 106 as the area (evaluation frames 1-4 and 29-32) is more distant from the image sensor rotational axis. The closer to the image sensor rotational axis (evaluation frame 13-20) the area is, the change in the evaluation value is less significant by tilting the image sensor 106. This is because the image sensor rotational axis in the step S801 is focused, and the in-focus state is maintained in this area. It is thus difficult to obtain an accurate optimal tilt angle in the step S804 in the evaluation frame in the area close to the image sensor rotational axis, which may cause noises in performing the optimal tilt angle coincidence determination in the step S812. This embodiment excludes the evaluation frame determined to be close to the image sensor rotational axis from the target of the optimal tilt angle coincidence determination (the evaluation frame determined by the tilt focal plane detector 113).

In the step S806, the tilt/zoom/focus controller 115 determines whether the evaluation frame set in the step S802 is an evaluation frame set in a low contrast area, based on the tilt scanning result acquired in the step S803. More specifically, the tilt/zoom/focus controller 115 determines whether or not a difference value between the maximum value and the minimum value of the evaluation value acquired in the step S803 is smaller than a predetermined value. When the difference value is smaller than the predetermined value, the flow proceeds to the step S809, and when larger than the predetermined value, the flow proceeds to the step S807. When the difference value is equal to the predetermined value, whichever can be arbitrarily set.

As in the evaluation frames 21, 24, 25, 28, 29, and 32 in FIG. 9, when the evaluation frame is uniform and there is no object whose contrast is to be evaluated, it is difficult to obtain an accurate optimal tilt angle in the step S804. Therefore, the evaluation frame in which it is determined that the difference value between the maximum value and the minimum value of the evaluation value acquired in the step S803 is less than the predetermined value is excluded from the target of the optimal tilt angle coincidence determination.

In the step S807, the tilt/zoom/focus controller 115 determines whether or not the evaluation frame set in the step S802 has a plurality of evaluation value peaks, based on the result of the tilt scanning acquired in the step S803. If the evaluation frame set in the step S802 has a plurality of evaluation value peaks, the flow proceeds to the step S809. If the evaluation frame does not have the plurality of evaluation value peaks or there is only one evaluation value peak, the flow proceeds to step S808.

The tilt angle at which the evaluation value peak 602 is obtained may be different from the accurate optimal tilt angle 603 due to the influence of disturbance. Thus, the evaluation frames having a plurality of evaluation value peaks are excluded from the target of the optimal tilt angle coincidence determination.

In the step S808, the tilt/zoom/focus controller 115 determines whether or not the evaluation frame set in the step S802 has an object whose luminance value is equal to or larger than a predetermined value, based on the image information obtained in each evaluation frame. If the evaluation frame set in the step S802 has the object with the luminance value equal to or larger than the predetermined value, the flow proceeds to the step S809, and if the evaluation frame does not have the object with the luminance value equal to or larger than the predetermined value, the flow proceeds to the step S812.

For an object such as a point light source, a higher evaluation value may be obtained in a blurred state in the in-focus determination using the contrast for the evaluation value. If there is an object with a high luminance value such as a point light source in the evaluation frame, it is difficult to obtain an accurate optimal tilt angle in the step S804. Hence, the evaluation frame determined to have the object with the luminance value equal to or larger than the predetermined value is excluded from the target of the optimal tilt angle coincidence determination.

In the step S809, the tilt/zoom/focus controller 115 determines whether or not there is a remaining evaluation frame not to be excluded in the step S805 to S808. If there is a remaining evaluation frame not to be excluded, the flow proceeds to the step S810, and if there is no remaining evaluation frame not to be excluded, the flow proceeds to step S811.

In the step S810, the tilt/zoom/focus controller 115 excludes the evaluation frame to be excluded from the target of the optimal tilt angle coincidence determination in the step S812, which will be described later.

In the step S811, the tilt/zoom/focus controller 115 changes settings of various types of predetermined values used for the step S S806 and S808. The predetermined values used for the steps S806 and S808 are set to be smaller than the predetermined value set last time.

In the step S812, the tilt focal plane detector 113 performs the optimal tilt angle coincidence determination using the evaluation frames other than the evaluation frames excluded in the step S810.

In the step S813, the tilt angle calculator 114 maintains the angular range having the most coincidences obtained in the step S812.

In the step S814, the tilt/zoom/focus controller 115 performs the tilt control for driving the image sensor 106 such that the tilt angle is located within the angular range having the most coincidences maintained in the step S406.

As described above, this embodiment performs the optimal tilt angle coincidence determination after excluding the evaluation frame that has difficulties in providing an accurate tilt angle, thereby obtaining a tilt angle suitable for the focal plane with higher accuracy.

Third Embodiment

While the first and second embodiments discuss only one tilt focus plane in the imaging scene, in practice, there may be two or more areas detected as the tilt focus plane. However, where there are a plurality of areas detected as the tilt focal plane, all areas cannot be focused. This embodiment provides a control where there are a plurality of areas in the imaging scene that are detected as the focus plane.

Figure 10:
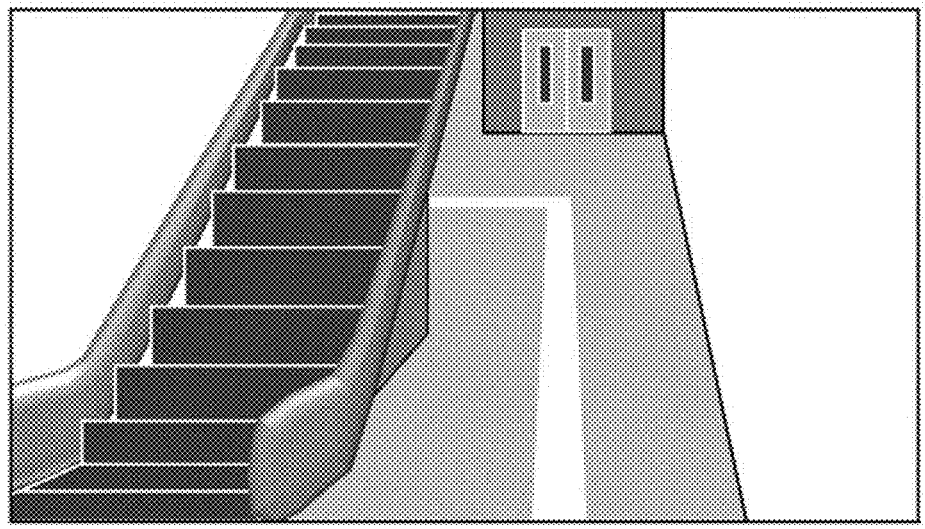
FIG. 10 illustrates a scene having two areas to be detected as a tilted focus plane.
Figure 11:
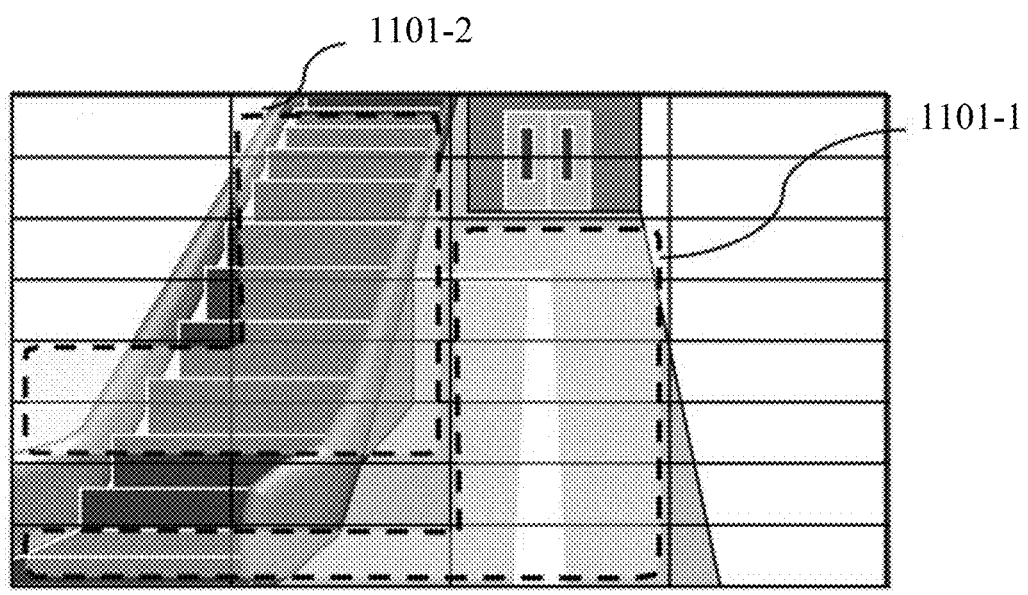
FIG. 11 illustrates a tilt focus plane detection result for a scene having two areas to be detected as the tilt focus plane.

FIG. 10 illustrates an illustrative scene having two areas detected as the tilt focus plane. Herein, areas of a passage and an escalator correspond to the areas detected as the tilt focal plane. FIG. 11 illustrates two areas detected as the tilt focus plane as a result of performing the optimal tilt angle coincidence determination illustrated in the steps S405 and S812 in the first and second embodiments for the scene of FIG. 10. Two areas 1101-1 and 1101-2 detected as the tilt focus plane correspond to the passage area and the escalator area, respectively, and both have the same optimal tilt angle corresponding to eight evaluation frames. Thus, where the same number of evaluation frames with different optimal tilt angles coincide with each other in the optimal tilt angle coincidence determination, this scene has a plurality of areas detected as the tilt focus plane.

FIG. 12 is a table that shows a correspondence between four control methods and use cases suitable for the control methods when there are a plurality of areas detected as the tilt focus plane.

A first control method is a control to set the highest optimal tilt angle among a plurality of optimal tilt angles determined to coincide with each other by the same number of evaluation frames. At this time, the passage area 1101-1 can be focused in the illustrative scene in FIG. 10 through the control that sets the largest optimal tilt angle. The reason why the higher optimal tilt angle is used is that the control with the higher optimal tilt angle can provide a deeper depth than the control with the smaller optimal tilt angle, and thus a higher tilt control effect. Therefore, this control method is suitable for the imaging scene that always gives priority to a deeper depth.

A second control method is a control to set the lowest optimal tilt angle among a plurality of optimal tilt angles determined to coincide with each other by the same number of evaluation frames. The escalator area 1101-2 can be focused in the illustrative scene in FIG. 10. The reason why the lower optimal tilt angle is used is to suppress blurs caused by the tilt control in the direction vertical to the tilt focal plane. The focal plane and the blurring direction are always orthogonal to each other, and when the focal plane is a horizontal plane to the ground, the blurring direction is orthogonal to the ground. In other words, as the tilt angle is higher in the tilt control to make the tilt focal plane closer to the horizontal plane, the blur is increased for a vertically long object. Therefore, this control method is suitable for the imaging scene that gives priority to suppressing vertical blurs for the tilt focal plane, such as an imaging scene having a vertically long object.

A third control method is a control to calculate an average value of a plurality of optimal tilt angles determined to coincide with each other by the same number of evaluation frames, and to set the calculated tilt angle. The calculation of the average value may use a value obtained by weighting the acquired optimal tilt angle. In the illustrative scene in FIG. 10, both the passage area 1101-1 and the escalator area 1101-2 can have properly increased depths. The first and second control methods may generate a large blur amount in an area that is not finally detected as a tilt focus plane among the areas detected as a tilt focus plane, whereas this control method can restrain a large blur amount in any area detected as the tilt focal plane. Therefore, this control method is suitable for an imaging scene that gives priority to a wider in-focus range.

A fourth control method is a control that allows a user to select an area to be focused among a plurality of areas detected as the tilt focal plane, and sets the tilt angle of the selected area. When the user selects the area, a plurality of areas detected as the tilt focus plane are displayed on an image viewable by the user, and a UI is provided to enable the user to select one of the plurality of areas. In the illustrative scene in FIG. 10, the escalator area 1101-2 can be focused if the area that the user wants to view is the escalator area 1101-2. The first, second, and third control methods may not focus on the area intended by the user, whereas this control method guarantees focusing on the area intended by the user. Thus, this control method is suitable when the area that the user wants to view is determined.

Which control method to follow among the above four control methods may be determined by user settings, or may be automatically determined by the imaging apparatus.

As described above, when there are a plurality of in-focus areas in the tilt control in the imaging scene, this embodiment can provide a variety of tilt controls suitable for the use case, such as the deeper depth priority case, the case that gives priority to suppressing vertical blurs for the tilt focus plane, the wider in-focus range priority case, and the noticeable area determined case.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-203640, filed on Oct. 30, 2018 and 2019-173150, filed on Sep. 24, 2019 which are hereby incorporated by reference herein in their entirety.

What is claimed is:

1. A control method of an imaging apparatus comprising:
changing a tilt angle between an image sensor and a plane orthogonal to an optical axis of an optical system by adjusting a tilt of the image sensor or the optical system;
acquiring area contrast evaluation values for each area of a plurality of areas in an image by changing the tilt angle; and
determining an area tilt angle for each of the plurality of areas based on the area contrast evaluation values corresponding to each of the plurality of areas, and of determining a target tilt angle based on a plurality of area tilt angles,
wherein, while changing the tilt angle, the tilt of the image sensor or the optical system is adjusted based on the determined target tilt angle.

2. The control method according to claim 1, wherein each of the plurality of areas includes one or more pixels.

3. The control method according to claim 1, wherein in determining the area tilt angle, as the area tilt angle, an optimal area tilt angle is acquired corresponding to a respective maximum area evaluation value among the area contrast evaluation values of the plurality of areas, for each of the plurality of areas, and, as the target tilt angle, an optimal area tilt angle having the largest number of coincidences with a plurality of optimal area tilt angles is determined.

4. The control method according to claim 3, wherein in determining the area tilt angle, the target tilt angle belonging to a predetermined angular range to which most optimal area tilt angles among the plurality of optimal area tilt angles correspond is determined.

5. The control method according to claim 4, wherein in determining the area tilt angle, the tilt angle is calculated based on at least one of a minimum value, a maximum value, an average value, and a tilt angle corresponding to an absolute value larger than a predetermined value of a respective maximum area evaluation value out of a plurality of respective maximum area evaluation values among the predetermined angular range.

6. The control method according to claim 5, wherein the average value is calculated based on the maximum value and the minimum value of the area contrast evaluation values obtained in each of the plurality of areas and on a weighted value.

7. The control method according to claim 6, wherein an average value is calculated by a weighted value based on a peak shape of the area contrast evaluation values acquired in each of the plurality of areas.

8. The control method according to claim 3, wherein in changing the tilt angle, an area is excluded from the plurality of areas where the area tilt angle obtained with a reliability equal to or below a first reliability is obtained.

9. The control method according to claim 8, wherein in changing the tilt angle, an area near a rotational axis of the image sensor is determined as the area where the optimal area tilt angle with the reliability equal to or below the first reliability is obtained.

10. The control method according to claim 8, wherein in changing the tilt angle, an area where a difference value between a maximum value and a minimum value of the area contrast evaluation values is determined to be smaller than a predetermined value is determined, as the area where the optimal area tilt angle with the reliability equal to or below the first reliability is obtained.

11. The control method according to claim 8, wherein in changing the tilt angle, an area determined to have a plurality of peaks obtained from the area contrast evaluation values is determined, as the area where the optimal area tilt angle with the reliability equal to or below the first reliability is obtained.

12. The control method according to claim 8, wherein in changing the tilt angle, an area determined to have an object having a luminance value equal to or higher than a predetermined value is determined, as the area where the optimal area tilt angle with the reliability equal to or below the first reliability is obtained.

13. The control method according to claim 1, wherein in determining the area tilt angle, a plurality of optimal area tilt angles are determined within a predetermined angular range to correspond to the same target tilt angle.

14. The control method according to claim 13, wherein the predetermined angular range is determined based on a depth of focus calculated using at least one of a focal length, an object distance, a size of the image sensor, a light source, a temperature, and a humidity.

\* \* \* \* \*